United States Patent [19]
Sassi et al.

[11] Patent Number: 5,549,314
[45] Date of Patent: Aug. 27, 1996

[54] NON-CIRCULAR FRONT CHAIN WHEEL FOR CRANK GEAR

[76] Inventors: Michel Sassi, Quartier La Croix, Breil Sur Roya 06540; Jean-Louis Talo, 34 Val du Carei, Menton 06500, both of France

[21] Appl. No.: 211,435
[22] PCT Filed: Oct. 7, 1994
[86] PCT No.: PCT/FR92/00945
  § 371 Date: Apr. 11, 1994
  § 102(e) Date: Apr. 11, 1994
[87] PCT Pub. No.: WO93/07044
  PCT Pub. Date: Apr. 15, 1993

[30] Foreign Application Priority Data

Oct. 11, 1991 [FR] France .................................. 91 12845

[51] Int. Cl.⁶ ............................................................ B62M 9/08
[52] U.S. Cl. ........................... 280/259; 280/236; 474/141
[58] Field of Search .................................. 280/236, 210, 280/238, 241, 259, 261; 474/141

[56] References Cited

U.S. PATENT DOCUMENTS

| 515,449 | 2/1894 | Scovell | 474/141 |
|---|---|---|---|
| 3,899,932 | 8/1975 | Durham | 474/141 |
| 4,133,550 | 1/1979 | Brown | 280/210 |

FOREIGN PATENT DOCUMENTS

| 64514 | 5/1946 | Denmark | 474/141 |
|---|---|---|---|
| 645447 | 6/1928 | France | 474/141 |
| 2351851 | 12/1977 | France | 280/259 |
| 2440863 | 6/1980 | France | |
| 2527542 | 12/1983 | France | |
| 8522573 | 12/1985 | Germany | |
| 3709482 | 10/1988 | Germany | |
| 459932 | 10/1950 | Italy | 474/141 |
| 18888 | 8/1913 | United Kingdom | 474/141 |
| 449504 | 6/1936 | United Kingdom | 474/141 |

OTHER PUBLICATIONS

International Preliminary Examination Report in French.
International Search Report in English.

*Primary Examiner*—Mitchell J. Hill
*Attorney, Agent, or Firm*—Greenblum & Bernstein P.L.C.

[57] ABSTRACT

Non-circular front chain wheel for a crank gear is comprised of a crank gear wheel allowing to a progressive increase of the cycling torque from the dead point up to the point where the extension of the leg allows to create the maximum effort, due to a progressive variation of the primitive radius of the toothing between these two points, followed by a rapid decrease to the next dead point. The principle is that the force to be provided is proportional to the muscular force that the user may provide. The non-circular front chain wheel essentially pertains to the cycle industry but may also find applications in other fields, for example physical exercisers for body building or reeducation, and in general all apparatus utilizing cycling motion and a chain or belt transmission system between the front wheel or wheels of the crank gear and one or a plurality of pinions actuating the device to be driven.

18 Claims, 2 Drawing Sheets

NON-CIRCULAR FRONT CHAIN WHEEL FOR CRANK GEAR

BACKGROUND OF THE INVENTION

The present invention relates to a non-circular front chain wheel for crank gear.

It mainly concerns the cycle industry but may also find applications in other fields, such as physical exercise apparatus for body-building or rehabilitation, and in general, all apparatus using cycling motion and a chain or belt transmission system between the front wheel or wheels of the crank gear and one or a plurality of pinions actuating the device to be driven.

In apparatus of this type, the load moment, or in other words, the force exerted by the chain on the front chain wheel of the crank gear can be thought to be substantially constant, whereas the driving torque produced by the cyclist, is variable by nature, passing cyclically from a lesser value at the upper and lower dead points when the arms of the pedals, or the cranks, are aligned with the saddle and the axis of the crank gear, and a maximum value when the arms are substantially horizontal.

For obvious reasons of ease, most often circular front chain wheels are used, resulting in numerous disadvantages:

Shocks, stress, speed variation, loss of power at the upper and lower dead points and loss of power, causing an increase in cardiac rhythm, Substantial start-up effort when the pedal is on top, Pedalling effort depends on the sine of the angle of the pedal arm with the axis of the dead points, and is not a function of human ability, Cycling motion is not synchronous with natural effort, resulting in disproportionate muscular, tendon and joint efforts, thereby limiting performance as well as pleasure, Lack of motor function in all-terrain cycling due to drive torque variations, Necessitates rapid increase in rotational capacity to avoid muscular overload, which results in energy loss in the dynamic effects on the legs, Loss of energy in the crank gear axis due to the radial components of the effort provided by the cyclist, Acceleration is not in proportion with the effort communicated to the pedal, The related muscles, tendons and joints work in a jerky manner and are subject to substantial variations in effort.

A number of efforts to improve crank gear functioning have been suggested. For example, FR 83 09 015 describes an elliptical front chain wheel for a crank gear whose biggest radii correspond to the dead points. The foremost objective of this device is to obtain greater speed, but as it does not take into account muscle characteristics, it results in an increased variation in the efforts to be provided and increased tiredness, without, however, obtaining satisfactory results.

DE-A-3 709 482 and DE-U-8 522 573 also describe non-circular front chain wheels. These documents may seem to represent a slight improvement from the energy point of view, but by virtue of their geometry, do not enable the load moment of the front chain wheel to correspond with the potential possibilities of muscular forces that inherently characterize human anatomy.

SUMMARY OF THE INVENTION

The device as per the present invention eliminates all of these disadvantages. As a matter of fact, it enables more natural pedalling by adapting, for each pedal position, the radius of the front chain wheel of the crank gear in accordance with the following parameters:

muscle force, tendon and joint resistance, geometry of the man-machine assembly, speed and acceleration of the vehicle and of the cycling motion, necessary moment, muscle sensation, type of pedalling desired.

It is constituted by a crank gear wheel enabling the cycling torque to be increased progressively from the dead point up to the point where the extension of the leg allows creation of the maximum effort, by virtue of a progressive variation of the primitive radius of the toothing between these two points, followed by a rapid decrease to the next dead point. The principle is that the force to be provided is proportional to the muscular force that the user may provide.

BRIEF DESCRIPTION OF THE DRAWINGS

In the annexed drawings, provided as non-limiting examples of one of the embodiments of the object of the invention.

DETAILED DESCRIPTION OF THE PREFERRED EMBODIMENTS

Figure 1:
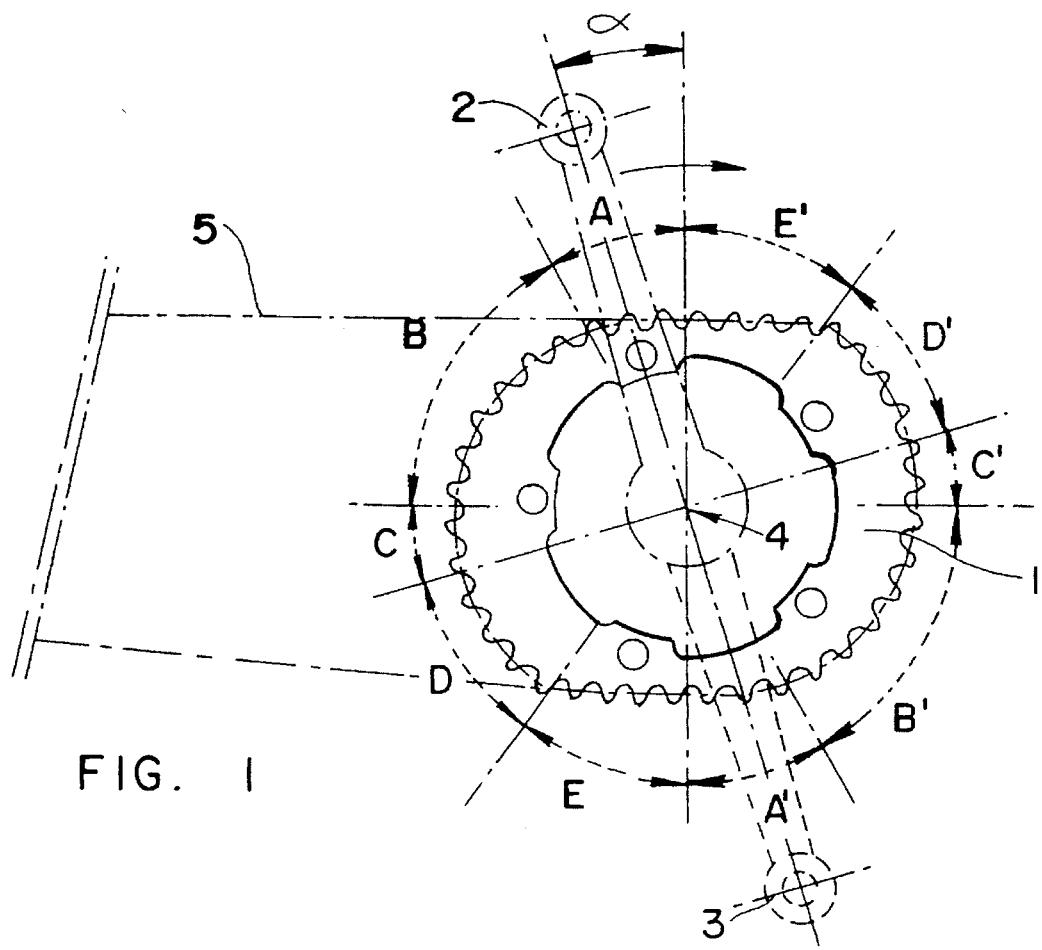
FIG. 1 represents a serrated front chain wheel with pedals at the upper dead point, the tangent point of the stretched portion of the chain corresponding substantially to the smallest radius.
Figure 2:
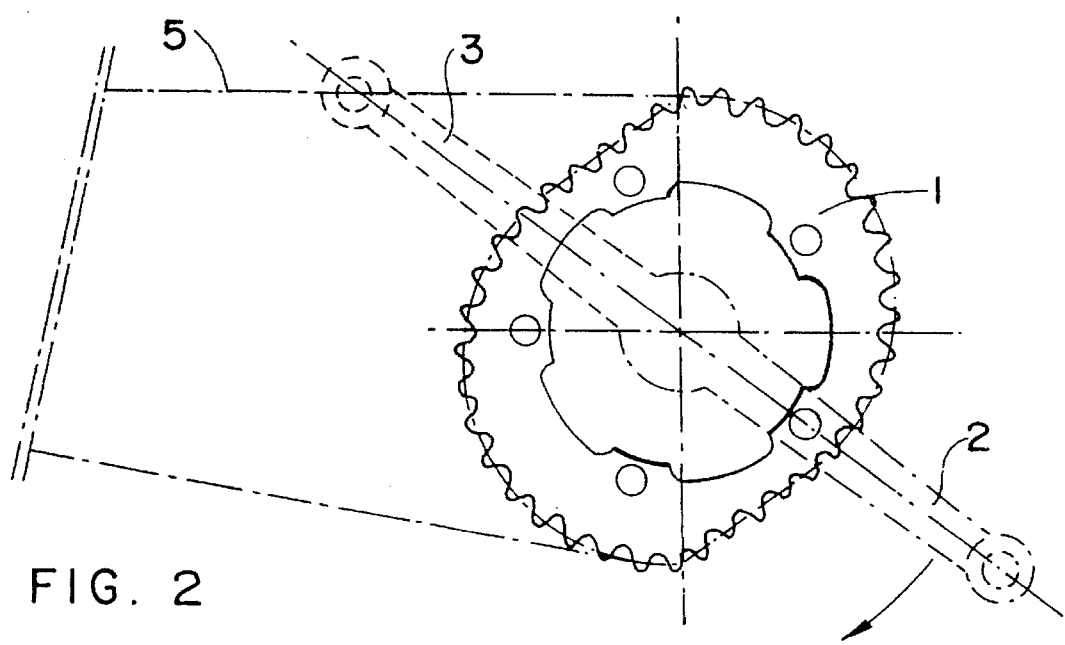
FIG. 2 shows the same front chain wheel at the point of greatest effort, the tangent point corresponding substantially to the biggest radius, and FIG. 3 illustrated another embodiment of the invention wherein a belt is utilized instead of a chain.
Figure 3:
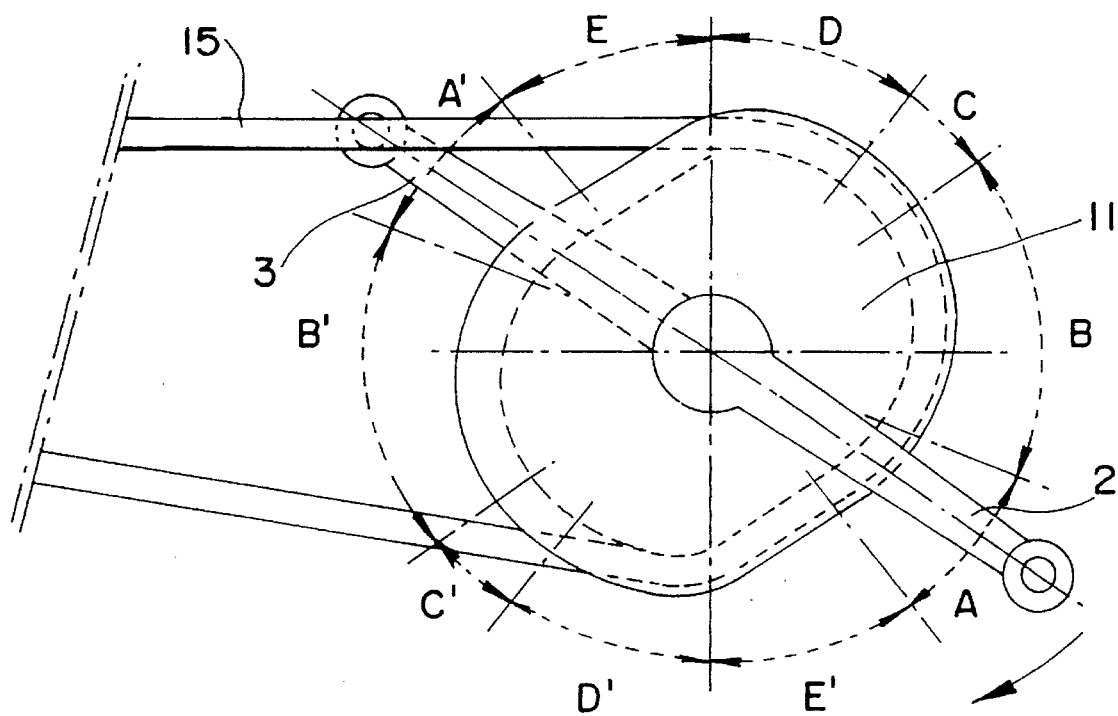

The device, FIGS. 1 and 2, is constituted by a serrated front chain wheel 1 activated by two traditional pedals 2, 3, and driving a chain 5, also traditional.

If one were to consider FIG. 1, the left portion of front chain wheel 1 is divided into several zones demarcated by angles measured from the point at which the primitive radius of the toothing is the least, in the opposite direction with respect to the rotation of the front chain wheel. In the current example, these angles correspond to the case of an ordinary bicycle whose line passing through the axis of the crank gear and the saddle forms an angle close to 17° with respect to the vertical, and whose chain 5 is substantially horizontal. The angular values indicated can vary in accordance with the construction of the bicycle.

These zones are as follows:

Zone A (0° to 30°)

Passage to the upper dead point. The radius is smallest and very slightly on the increase, power is obtained by the speed of rotation and the force to be applied is small. Progressive engagement eliminates all shocks and does not create cardiac problems. Increase of the radius is substantially equal to 6% for a serrated front chain wheel 1 having a radius which is at most 25% greater than the minimum radius.

Zone B (30° to 90°)

The radius increases in proportion to the sine of the angle and to muscle force. The radius increases greatly. The greatest radius increase is close to 17% for a serrated front chain wheel having a radius which is at most 25% greater than the minimum radius.

Zone C (90°0 to 107°)

Cycling torque is very strong, the radius stretches towards the maximum diameter with an increase of approximately 2%.

Zone D (107° to 143°)

Drive torque is strong, muscular force continues to increase, in addition the bicycle has reached a certain speed, the radius is constant, possibly very slightly on the increase or decrease, for certain types of pedalling.

Zone E (143° to 180°)

The radius rejoins the smallest diameter, its end describing a perpendicular right angle at the smallest radius, or a curve with a very large radius, accelerating the rotation of the crank gear to pass the dead point more easily by decreasing its passage time, which results in more constant motor function.

On the right portion of front chain wheel 1 are to be found naturally the same zones, referenced A', B', C', D', E' The discovery that is the object of the present invention resulting in a front chain wheel demarcated by two successive similar curves having a single central symmetry i.e., symmetry in relation to a single point, with respect to central axis 4 of the crank gear, and no symmetry with respect to a straight line, as in the case of ovals or ellipses i.e., do not have axial symmetry. The drive chain wheel does not possess axial symmetry. The smallest radii of the front chain wheel correspond to the upper and lower dead points, and the largest radii correspond to zones C, D, C', D', Pedals 2, 3 are affixed to front chain wheel 1 such that their arms form, with a straight line passing through the axis of the latter and the smallest radius point, a wedging angle α equal to the angle formed with the corresponding radius at the tangent point of the stretched side of chain 5, by a line connecting the saddle to the axis of the crank gear. In traditional bicycles this angle is of the order of 14 to 17 degrees. For a bicycle where the cyclist is lying down flat ("Velorizontal"), it would be 70 degrees. This wedging angle is extremely important and defines the position of the pedals with respect to serrated front chain wheel 1.

The difference between the small and big radius, which can vary in accordance with the type of pedalling, is comprised between 18% and 30%, but is preferably substantially equal to 25%. This parameter is very important and chiefly defines the maximum acceptable speed of rotation which is, for ordinary bicycles, 100 revolutions/minute, which corresponds to a radius difference substantially equivalent to 25%. Radius increases in zones A, A', B, B', C and C' vary in proportion to the difference between the smallest and biggest radius primitive radii The crank gear can comprise several front wheels as per the invention, the passage of chain 5 from one to another taking place by virtue of a gearshift of a known type. For example, the number of teeth for a bicycle crank gear can range from 20 to 58 teeth. The chain can, however, be replaced by a belt 15 or other similar means driven by a wheel 11 whose radius varies in the same way as for the serrated front chain wheel described hereinabove.

Front chain wheel 1 can be manufactured from metal, light metallic alloy or synthetic resin or other. Its thickness will be of the order of 2.5 to 3.5 mm. Holes in nonfunctional areas enable the system to be made lighter.

The principle of the present invention is such that, in light of the man-machine system, acceleration at each push of the pedal, air resistance and a pedalling speed of 0 to 100 revolutions/minute, the power and energy to be supplied to the system during rotation are in proportion to that which a person can provide with his natural musculature by minimizing voluntary muscle stress. This principle also takes into account that the energy produced by the cyclist should be used as motive energy with minimum loss due to radial force components on the pedals. Finally, the principle enables elimination of shocks, hard and soft points that are harmful to the organism from the points of view of muscles and joints with cardio-pulmonary consequences. The geometry of the crank gear described corresponds to the least stress curve.

The positioning of the various component elements provides the object of the invention with a maximum of useful effects which had not been, up until now, obtained by similar devices.

We claim:

1. Front chain wheel as a crank gear of a bicycle, comprising:

a non-circular drive chain wheel having a central axis, and comprising a single central symmetry with respect to said central axis of said non-circular drive chain wheel; and said non-circular drive chain wheel does not possess axial symmetry with respect to said central axis;

said non-circular drive chain wheel is capable of rotating around said central axis and comprises two halves, each half of said non-circular drive chain wheel comprises five zones of varying radius angularly positioned in an opposite direction with respect to rotation of said non-circular drive chain wheel;

said non-circular drive chain wheel comprises an upper dead point, a lower dead point, a minimum primitive radius, and a maximum primitive radius; and said five zones of one of said two halves comprise:

zone A at an angle of approximately 0° to 30° comprising passage to said upper dead point comprising said minimum primitive radius and slightly increasing;

zone B at an angle of approximately 30° to 90° wherein the varying radius increases in proportion to sine of the angle;

zone C at an angle of approximately 90° to 107° wherein the varying radius increases towards a maximum;

zone D at an angle of approximately 107° to 143°;

zone E at an angle of approximately 143° to 180° wherein the varying radius again becomes equal to said minimum primitive radius; and said five zones of one of the other of said two halves comprise:

zones A', B', C', D' and E' corresponding to zones A, B, C, D and E, respectively, with zone A' following zone E.

2. The front chain wheel as defined by claim 1, comprising a chain on said non-circular drive chain wheel, said chain including a stretched portion that contacts said non-circular drive chain wheel at a tangent point;

said non-circular drive chain wheel comprises a varying primitive radius corresponding to said tangent point; and pedals associated with said non-circular drive chain wheel, said pedals comprising arms so that said arms of said pedals form, with a plane passing through said central axis and a point wherein said varying primitive radius is smallest, a wedging angle α.

3. The front chain wheel as defined by claim 1, comprising a chain on said non-circular drive chain wheel, said chain including a stretched portion that contacts said non-circular drive chain wheel at a tangent point;

pedals associated with said non-circular drive chain wheel for supplying torque to said non-circular drive chain wheel, and said non-circular drive chain wheel comprising an upper dead point, a lower dead point, a minimum primitive radius, and a maximum primitive radius; and said non-circular drive chain wheel comprises a varying primitive radius corresponding to said tangent point, said varying primitive radius comprises said minimum primitive radius at said upper and lower dead points, and increases progressively up to said maximum primitive radius, and decreases rapidly along a substantially planar curve up to said minimum primitive radius at said upper and lower dead points.

4. The front chain wheel as defined by claim 2, wherein said pedals comprise arms, and said pedals are affixed on said non-circular drive chain wheel so that said arms form, with a plane passing through said central axis and said minimum primitive radius, a wedging angle α.

5. The front chain wheel as defined by claim 1, wherein in zone D the varying radius is substantially constant.

6. The front chain wheel as defined by claim 5, comprising a chain on said non-circular drive chain wheel, and, in zone E, at said minimum primitive radius, the varying radius is substantially perpendicular to said chain.

7. The front chain wheel as defined by claim 1, comprising a chain on said non-circular drive chain wheel, and, in zone E, at said minimum primitive radius, the varying radius is substantially perpendicular to said chain.

8. The front chain wheel as defined by claim 1, wherein for a non-circular drive chain wheel having a maximum radius 25% larger than said minimum primitive radius, the varying radius increase of said non-circular drive chain wheel is substantially equal to 6% in zones A, A' increases by about 17% in zones B and B', and increases by about 2% in zones C and C'.

9. The front chain wheel as defined by claim 1, wherein said non-circular drive chain wheel comprises a serrated chain wheel for interacting with a chain.

10. The front chain wheel as defined by claim 1, comprising a belt on said non-circular drive chain wheel, said belt including a stretched portion that contacts said non-circular drive chain wheel at a tangent point;

said non-circular drive chain wheel comprises a varying primitive radius corresponding to said tangent point; and pedals associated with said non-circular drive chain wheel, said pedals comprising arms so that said arms of said pedals form, with a plane passing through said central axis and a point wherein said varying primitive radius is smallest, a wedging angle α.

11. The front chain wheel as defined by claim 1, comprising a belt on said non-circular drive chain wheel, said belt including a stretched portion that contacts said non-circular drive chain wheel at a tangent point;

pedals associated with said non-circular drive chain wheel for supplying torque to said non-circular drive chain wheel, and said non-circular drive chain wheel comprising an upper dead point, a lower dead point, a minimum primitive radius, and a maximum primitive radius; and said non-circular drive chain wheel comprises a varying primitive radius corresponding to said tangent point, said varying primitive radius comprises said minimum primitive radius at said upper and lower dead points, and increases progressively up to said maximum primitive radius, and decreases rapidly along a substantially planar curve up to said minimum primitive radius at said upper and lower dead points.

12. Front chain wheel as a crank gear of a bicycle, comprising:

a non-circular drive chain wheel having a central axis, and comprising a single central symmetry with respect to said central axis of said non-circular drive chain wheel;

said non-circular drive chain wheel does not possess axial symmetry with respect to said central axis;

a chain on said non-circular drive chain wheel, said chain including a stretched portion that contacts said non-circular drive chain wheel at a tangent point;

pedals associated with said non-circular drive chain wheel for supplying torque to said non-circular drive chain wheel, and said non-circular drive chain wheel comprising an upper dead point, a lower dead point, a minimum primitive radius, and a maximum primitive radius;

said non-circular drive chain wheel comprises a varying primitive radius corresponding to said tangent point, said varying primitive radius comprises said minimum primitive radius at said upper and lower dead points, and increases progressively up to said maximum primitive radius, and decreases rapidly along a substantially planar curve up to said minimum primitive radius at said upper and lower dead points;

said pedals comprising arms, and said pedals are affixed on said non-circular drive chain wheel so that said arms form, with a plane passing through said central axis and said minimum primitive radius, a wedging angle α; and said wedging angle α is between 14 and 17 degrees.

13. The front chain wheel as defined by claim 12, wherein a difference between said minimum primitive radius and said maximum primitive radius of said non-circular drive chain wheel is between 18 and 30 percent.

14. The front chain wheel as defined by claim 13, wherein the difference between said minimum primitive radius and said maximum primitive radius of said non-circular drive chain wheel is substantially equal to 25 percent.

15. Front chain wheel as a crank gear of a bicycle, comprising:

a non-circular drive chain wheel having a central axis, and comprising a single central symmetry with respect to said central axis of said non-circular drive chain wheel;

said non-circular drive chain wheel does not possess axial symmetry with respect to said central axis;

a chain on said non-circular drive chain wheel, said chain including a stretched portion that contacts said non-circular drive chain wheel at a tangent point;

pedals associated with said non-circular drive chain wheel for supplying torque to said non-circular drive chain wheel, and said non-circular drive chain wheel comprising an upper dead point, a lower dead point, a minimum primitive radius, and a maximum primitive radius;

said non-circular drive chain wheel comprises a varying primitive radius corresponding to said tangent point, said varying primitive radius comprises said minimum primitive radius at said upper and lower dead points, and increases progressively up to said maximum primitive radius, and decreases rapidly along a substantially planar curve up to said minimum primitive radius at said upper and lower dead points; and a difference between said minimum primitive radius and said maximum primitive radius of said non-circular drive chain wheel is between 18 and 30 percent.

16. The front chain wheel as defined by claim 15, wherein the difference between said minimum primitive radius and said maximum primitive radius of said non-circular drive chain wheel is substantially equal to 25 percent.

17. Front chain wheel as a crank gear of a bicycle, comprising:

a non-circular drive chain wheel having a central axis, and comprising a single central symmetry with respect to said central axis of said non-circular drive chain wheel;

said non-circular drive chain wheel does not possess axial symmetry with respect to said central axis;

a chain on said non-circular drive chain wheel, said chain including a stretched portion that contacts said non-circular drive chain wheel at a tangent point;

pedals associated with said non-circular drive chain wheel for supplying torque to said non-circular drive chain wheel, and said non-circular drive chain wheel comprising an upper dead point, a lower dead point, a minimum primitive radius, and a maximum primitive radius;

said non-circular drive chain wheel comprises a varying primitive radius corresponding to said tangent point, said varying primitive radius comprises said minimum primitive radius at said upper and lower dead points, and increases progressively up to said maximum primitive radius, and decreases rapidly along a substantially planar curve up to said minimum primitive radius at said upper and lower dead points;

said pedals comprising arms, and said pedals are affixed on said non-circular drive chain wheel so that said arms form, with a plane passing through said central axis and said minimum primitive radius, a wedging angle $\alpha$; and a difference between said minimum primitive radius and said maximum primitive radius of said non-circular drive chain wheel is between 18 and 30 percent.

18. The front chain wheel as defined by claim 17, wherein the difference between said minimum primitive radius and said maximum primitive radius of said non-circular drive chain wheel is substantially equal to 25 percent.

* * * * *

UNITED STATES PATENT AND TRADEMARK OFFICE
CERTIFICATE OF CORRECTION

PATENT NO. : 5,549,314
DATED : August 27, 1996
INVENTOR(S) : Michel SASSI et al.

It is certified that error appears in the above-indentified patent and that said Letters Patent is hereby corrected as shown below:

On the cover page at item [22], viz., "PCT Filed:", change "Oct. 7, 1994" to ---Oct. 9, 1992---.

Signed and Sealed this

Sixteenth Day of September, 1997

Attest:

BRUCE LEHMAN

Attesting Officer      Commissioner of Patents and Trademarks